Dec. 18, 1956 J. B. HARRISON 2,774,492
TRUCK DOCK RAMP
Filed Jan. 13, 1955 3 Sheets-Sheet 2
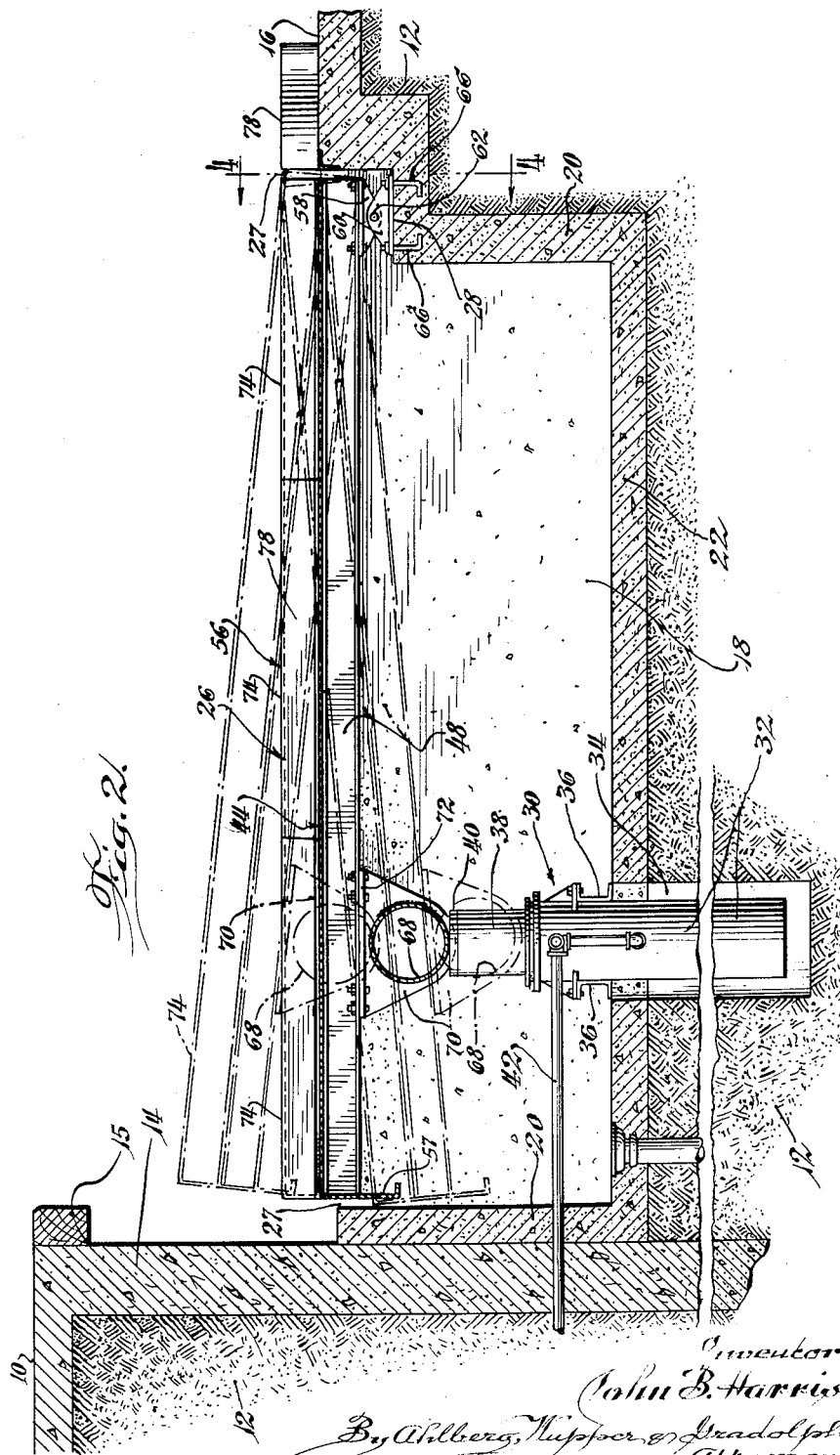
Inventor:
John B. Harrison
By Ahlberg, Hupper, & Gradolph
Attorneys.

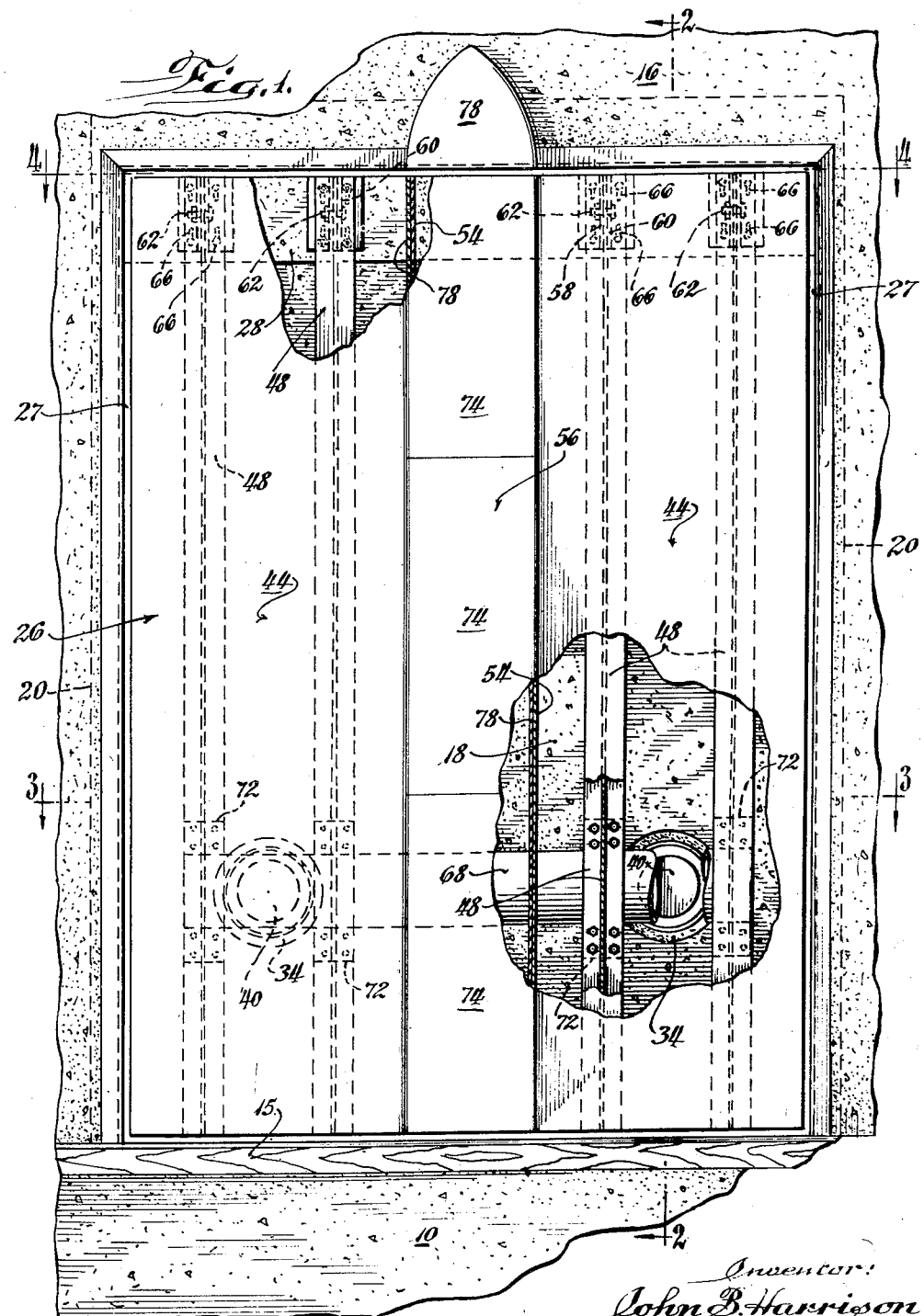

Dec. 18, 1956  J. B. HARRISON  2,774,492
TRUCK DOCK RAMP
Filed Jan. 13, 1955  3 Sheets-Sheet 3
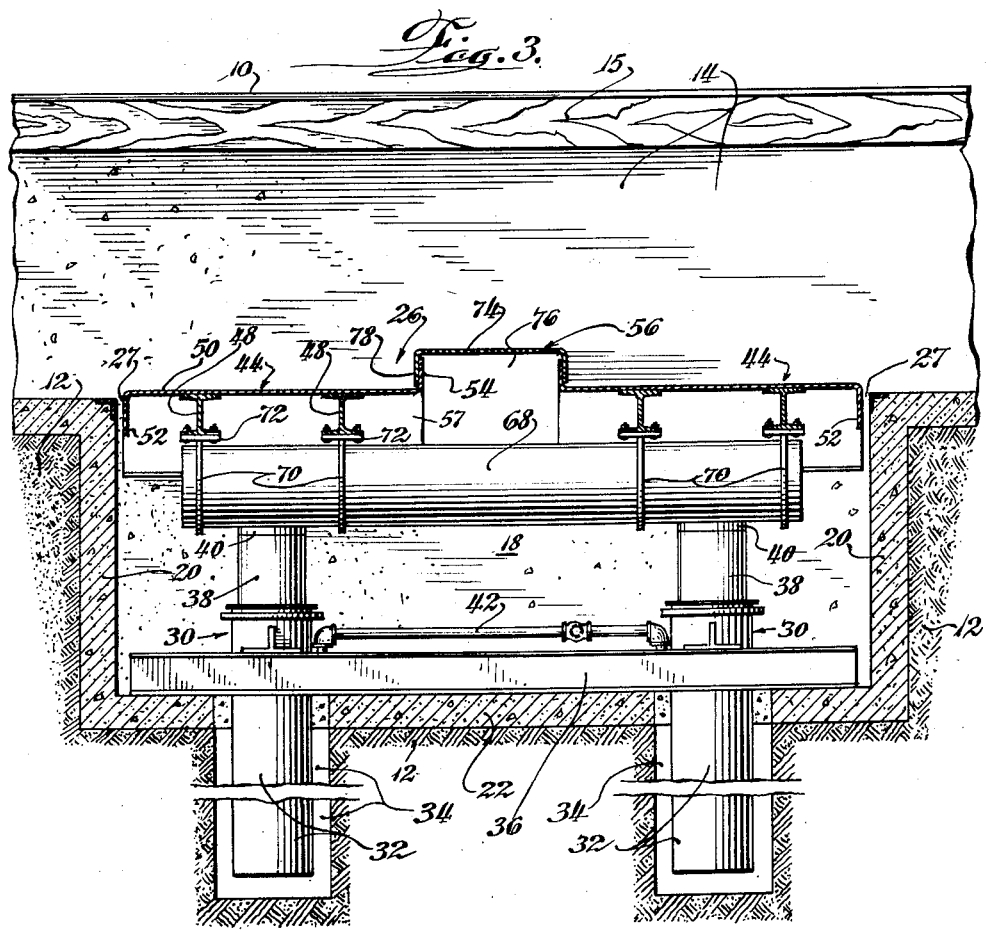
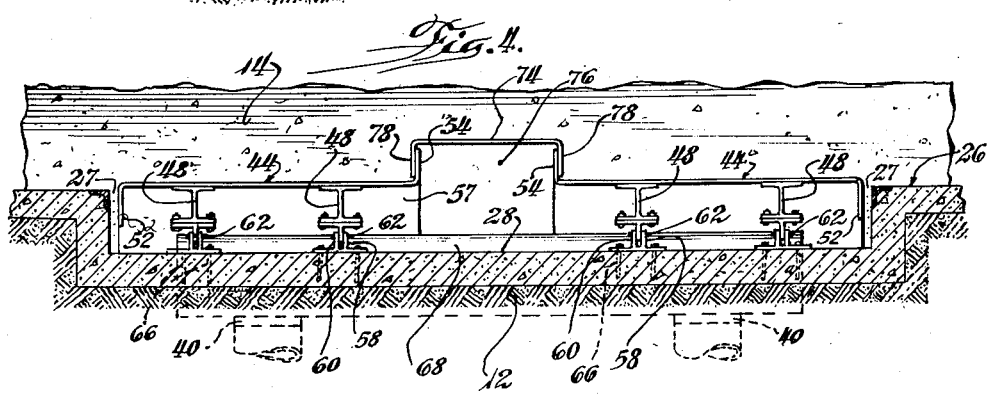
Inventor:
John B. Harrison
By Ahlberg, Kupper, & Gradolph
Attorneys.

2,774,492

United States Patent Office

Patented Dec. 18, 1956

2,774,492

TRUCK DOCK RAMP

John B. Harrison, Memphis, Tenn., assignor to Dover Corporation, a corporation of Delaware Application January 13, 1955, Serial No. 481,543

1 Claim. (Cl. 214—38)

The present invention relates to loading docks for highway trucks and more particularly to movable truck ramps located at the roadway level in front of dock platforms. Designed to support the rear wheels on both sides of a truck parked at a loading dock, a typical ramp is mounted for swinging movement about one end remote from the dock platform and adjusted vertically by power jacks to align the bed of a truck on the ramp with the dock platform.

A ramp of this type and its supporting structure must be capable of bearing up under a laterally unbalanced loading of a truck parked on the ramp. However, ramp adjusting jacking systems, which are most suitable from the standpoints of economy and performance, do not compensate adequately in the support which they provide to a ramp for lateral unbalance in the load on the ramp. Ramps and supporting structure capable of withstanding the great loads involved, which may be laterally out of balance, previously have had structural complications that ran up the cost of fabrication, shipping, and erection of each ramp installation.

One object of the invention is to provide in a highway truck loading dock, an improved vertically swingable highway truck support ramp in which exceptional strength for transmitting to one end of the ramp extreme lateral unbalance in heavy vertical loads applied to the ramp is provided by improved ramp structure well suited for economical manufacture and convenient shipping and adapted inherently for extremely easy installation in the loading dock.

Other objects and advantages will appear from the following description of the embodiment of the invention illustrated in the drawings, in which:

Figure 1 is a plan view of a truck loading dock embodying the invention, certain parts being partially broken away for clearness in illustration;

Fig. 2 is a longitudinal sectional view of the dock taken along the line 2—2 of Fig. 1 and illustrating the extreme raised and lowered positions of the truck ramp in phantom;

Fig. 3 is a transverse sectional view of the dock taken along the line 3—3 of Fig. 1; and Fig. 4 is a vertical sectional view taken along the line 4—4 of Fig. 1.

The truck dock incorporating the illustrated embodiment of the invention comprises a loading platform 10, Figs. 1 and 2, formed by a concrete slab (also denoted by the numeral 10) supported by a dirt fill 12 and a vertical retaining wall 14 extending downwardly from the forward edge of the platform. A wooden bumper 15 is attached to the upper edge of the retaining wall 14. The height of the platform 10 above the level of a roadway 16 in front of the dock approximates the average height of the beds of highway trucks.

A pit 18 dug below the level of the roadway surface 16 and extending outwardly from the retaining wall 14 is rectangular in shape, as viewed from above. The width of the pit along the forward edge of the platform 10 is somewhat greater than the overall width of the rear wheels of highway trucks. The extent of the pit perpendicular to the platform edge ordinarily exceeds the width of the pit. As shown, the pit is lined by concrete retaining walls 20 on all sides and by a concrete floor 22.

A vertically swingable ramp 26 designed to support the rear wheels on both sides of a truck (not shown) backed up to the dock platform 10 is shaped and dimensioned horizontally to fit within the upper end of the pit 18 with a slight clearance 27 between each edge of the ramp and the adjacent pit wall 20. The end of the ramp 26 remote from the dock platform 10 is swingably supported on a generally horizontal concrete ledge 28 extending laterally across the adjacent end of the pit 18 a short distance below the level of the roadway surface 16.

To provide a flush alignment between the bed of a truck (not shown) backed onto the ramp 26 and the platform 10, the ramp is swingably adjusted vertically about its pivotally supported outer end by a pair of hydraulic support jacks 30 installed in the pit 18 below the ramp. Preferably, the two jacks 30 are mounted under the respective longitudinal sides of the ramp 26, Fig. 3, substantially half way between the center and platform end of the ramp, Fig. 2.

The fluid cylinders 32 of the respective jacks 30 are supported vertically in two holes 34 extending down through and below the floor 22 of the pit by two support channels 36 resting on the pit floor. Vertically movable support plungers 38 extending upwardly from the respective jack cylinders 32 terminate at their upper ends with substantially flat, horizontal support heads 40.

The ramp support plungers 38 are raised and lowered by increasing and decreasing the supply of operating fluid under pressure in the jacking cylinders 32. The cylinders of both jacks are connected to a common fluid supply and exhaust line 42, Figs. 2 and 3, leading to conventional fluid supply and control structure (not shown) forming no part of the present invention.

Truck ramp jacking systems of the character described have many advantages from the standpoints of economy, dependability, and lifting capacity. However, as controlled by a common fluid supply system, the two hydraulic jacks 30 are incapable of compensating in the support which they provide to the respective sides of the ramp 26 for any substantial lateral unbalance in the loading on the ramp. Provisions previously made for supporting laterally unbalanced loads on truck ramps of this type have led to structural complications of the ramps or the ramp support structure, or both. Obviously, this has added to the cost of manufacture, transportation, and assembly of the equivalent necessary for an adjustable truck ramp installation.

The structural complications of previous truck ramps and adjustable ramp support structure are avoided by the extremely simple, yet sturdy construction of the ramp 26 provided by the invention. Fabricated from ordinary steel stock which requires little more than cutting the size, the improved ramp is suited for shipment within an extremely compact space and adapted for very simple erection at the place of installation to provide, when installed, full compensation from its pivotally supported end for extreme lateral unbalance in heavy loads supported on the ramp.

Structurally, the ramp 26 comprises a pair of longitudinal side units 44 (Figs. 1 and 3) on opposite sides of the ramp. Each side unit is formed by two spaced parallel longitudinal rails 48 running the full length of the ramp and supporting a flat steel floor plate 50 extending longitudinally over the full length of both rails and laterally beyond opposite sides of the respective rails.

Fabrication of the plate 50 is essentially a matter of cutting steel plate stock to size and bending the opposite longitudinal marginal edges at right angles to the center of the plate. The outer marginal edge of each plate (with respect to the ramp) forms a depending skirt 52. The inner marginal edge of each plate forms a support 54 for a central ramp curb 56 to be more fully described later. The rails 48 are fashioned from common I-beam stock which is merely cut to length and drilled along the lower flange for the attachment of simple mounting brackets. The floor plate 50 is fixed in position on the rails 48 by suitable welds or the like.

A simple skirt plate 57, Fig. 2, is fixed to the platform end of each side unit 44.

The stationary support ledge 28 is used in lieu of ramp structure to serve as lateral framing at the pivotally supported end of the ramp 26. Each longitudinal rail 48 is independently supported on the ledge 28 by a pair of brackets 58, 60 pivotally connected together by a pin 62 extending through aligned apertures in both brackets. The upper support bracket 58 for each rail is bolted to the lower flanges of the rail. The coacting lower bracket 60 is secured to the supporting ledge 28 by anchor bolts 66 set in the ledge, Fig. 2. The pivotal support provided by the four pairs of brackets 58, 60 to the respective rails 48 permits vertical swinging movement of the ramp 26 while at the same time anchoring the outer end of the ramp against significant horizontal or vertical movement in either direction.

The lateral or transverse framing used in the ramp 26 is confined to a steel torque tube 68 of substantial diameter cut to length from hollow, cylindrical stock. Supported slidably on the flat upper ends 40 of both jack plungers 38, the torque tube 68 is nonrotatably connected to the respective rails 48 by four strong plate brackets 70, each of which is capable of transmitting torque in the tube to the attached rail in which the force of the torque becomes a simple bending moment.

Structurally, each bracket 70 is formed by a flat plate member (also denoted by the numeral 70) of a generally triangular shape rounded at the lower corner. The plate 70 is centrally apertured to fit closely around the torque tube 68 and is welded to the cylindrical surface of the tube. A straight upper edge of the bracket plate 70, which has a length substantially greater than the diameter of the tube, is welded to the central portion of a rectangular flange member 72 that is bolted to the lower flange of the overlying rail 48 upon assembly of the ramp.

The structure of the ramp is completed by three similar plates 74, rectangular in shape, laid end to end along the longitudinal center of the ramp to cover the horizontal space 76, Figs. 3 and 4, between the adjacent edges 54 of the two side unit floor plates 50. The opposite longitudinal marginal edges 78 of each plate 74 are bent downwardly at right angles to the main portion of the plate to fit slidably over the outer faces of the upwardly extending side plate edges 54.

The three plates 74 together form the previously mentioned central curb 56 extending longitudinally along the full length of the ramp. The height of the curb is sufficient to assure proper lateral location of the rear wheels of a truck parked on the ramp.

The end of the curb 56 at the pivoted end of the ramp is aligned with a short continuation 78 of the curb mounted on the roadway 16 adjacent the pit 18. Constructed from metal plates, the stationary curb continuation 78 is narrowed to an apex pointing away from the ramp.

The pit 18 is accessible for inspection and repair of the ramp installation upon removal of one or more of the curb plates 74.

The structural components of the ramp 26 for the most part can be used without change in ramps of different widths. Upon erection of a ramp, the spacing between the two side units 44 is determined by the overall ramp width desired. The spacing of the brackets 70 along the torque tube 68 is conformed to the spacing between the overlying side rails 48. A torque tube 68 of a given length can be used in ramps of substantially different widths. However, fabrication of the torque tube in any event is merely a matter of cutting standard tubular stock to the proper length.

Actually the only structural modification of the ramp components necessary to vary the width of the ramp upon installation would be a change in the width of the cover plates 74 to properly span the opening 76 between the two side units 44.

The structural components of the ramp 26 can be shipped together in an extremely small space.

As previously explained, the application of a laterally unbalanced load to the ramp 26 after installation tends to force the more heavily loaded side of the ramp downwardly with respect to the opposite side of the ramp bearing the lighter load. However, it will be obvious from an inspection of Figures 1 and 2 that neither longitudinal side of the ramp 26 can be raised or lowered with respect to the other side of the ramp without changing the angular relationship of the longitudinal support rails 48 on opposite sides of the ramp with respect to each other. However, the torsional strength or resistance of the torque tube 68 is sufficient to maintain, even under the high stresses involved, a substantially fixed angular relationship between all the rails 48, thus effectively eliminating any tendency the ramp might otherwise have to twist about its longitudinal center line when subjected to a laterally unbalanced load.

Torsional stresses induced in the truck ramp structure by laterally unbalanced loads applied to the ramp are restricted to the torque tube 68 and the attached brackets 70, parts which are inherently suited to resist the twisting forces involved. The major stresses applied to the longitudinal rails 48 are bending moments which these I-beam members are well suited to withstand.

While I have shown and described a preferred embodiment of my invention it will be apparent that variations and modifications thereof may be made without departing from the principles and scope of the invention. I therefore desire, by the following claim, to include all such variations and modifications by which substantially the results of my invention may be obtained through the use of substantially the same or equivalent means.

I claim:

In a loading dock including a road surface for highway trucks and a loading platform abruptly elevated above the road surface, ramp means adapted to support a highway truck adjacent the platform and comprising a stationary ramp support located below the road surface and elongated horizontally in generally parallel spaced relation to the adjacent edge of the loading platform, vertically extendable jacking means mounted below the road surface between the ramp support and the loading platform, a cylindrical torque tube adapted to rest on the jacking means in substantially parallel spaced relation to the adjacent edge of the platform, two pairs of horizontally spaced vertical bracket plates welded to the tube in substantially encircling relation thereto on opposite sides of the longitudinal center of the tube, four parallel generally horizontal flanges fixed to the upper edges of said respective bracket plates, four anchor brackets disposed in a straight horizontal series substantially parallel to the torque tube and individually anchored to the ramp support in horizontal alinement with said respective torque tube bracket flanges, two longitudinal ramp units formed substantially as mirror images of each other; each ramp unit including two parallel longitudinal rails dimensioned lengthwise to extend horizontally from the ramp support substantially to the loading platform, a rectangular floor plate fixed to the upper edges of both rails and extending longitudinally for the full length of the rails and laterally beyond opposite sides of the respective rails, the longitudinal marginal edge of the floor plate on an inboard side thereof being turned sharply upward, and two pivotal support brackets attached to the underside of the respective rails adjacent one end of the ramp unit; the horizontal spacing between the longitudinal rails of the respective ramp units corresponding to the horizontal spacing between the two bracket flanges on the respective ends of the torque tube, four pivotal connectors pivotally connecting said respective anchor brackets individually to the respective support brackets on the two ramp units, means firmly securing said respective torque tube bracket flanges to the respective rails on the two ramp units, and removable plate means bridging the upturned marginal edges of the floor plates of the two ramp units to form a raised longitudinal curb between the two units.

References Cited in the file of this patent

UNITED STATES PATENTS

| | | |
|---|---|---|
| 2,547,460 | Hamilton | Apr. 3, 1951 |
| 2,560,064 | Astry | July 10, 1951 |
| 2,698,974 | White | Jan. 11, 1955 |

OTHER REFERENCES

Superior Railway Products publication, 255 (4 pages).
Rotary Leva-Dock publication, Re. 402 (6 pages).